Jan. 22, 1952  R. D. McLEOD  2,583,185
RAPID OPERATING POPPET AIR VALVE
Filed May 22, 1945  5 Sheets-Sheet 5
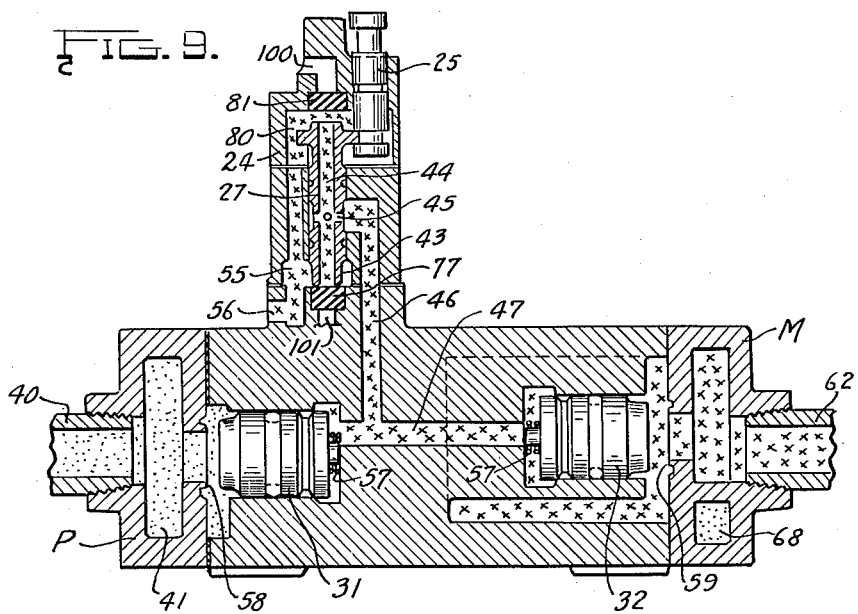
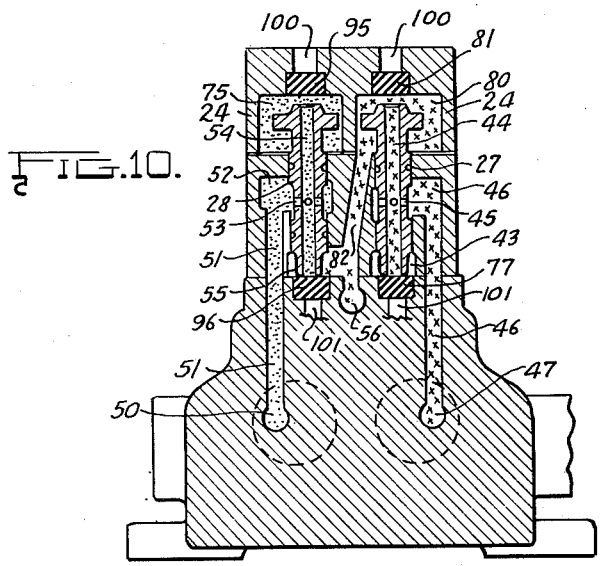
INVENTOR.
Roy D. McLeod
BY
Barnes, Kisselle, Laughlin & Raisch
ATTORNEYS Patented Jan. 22, 1952

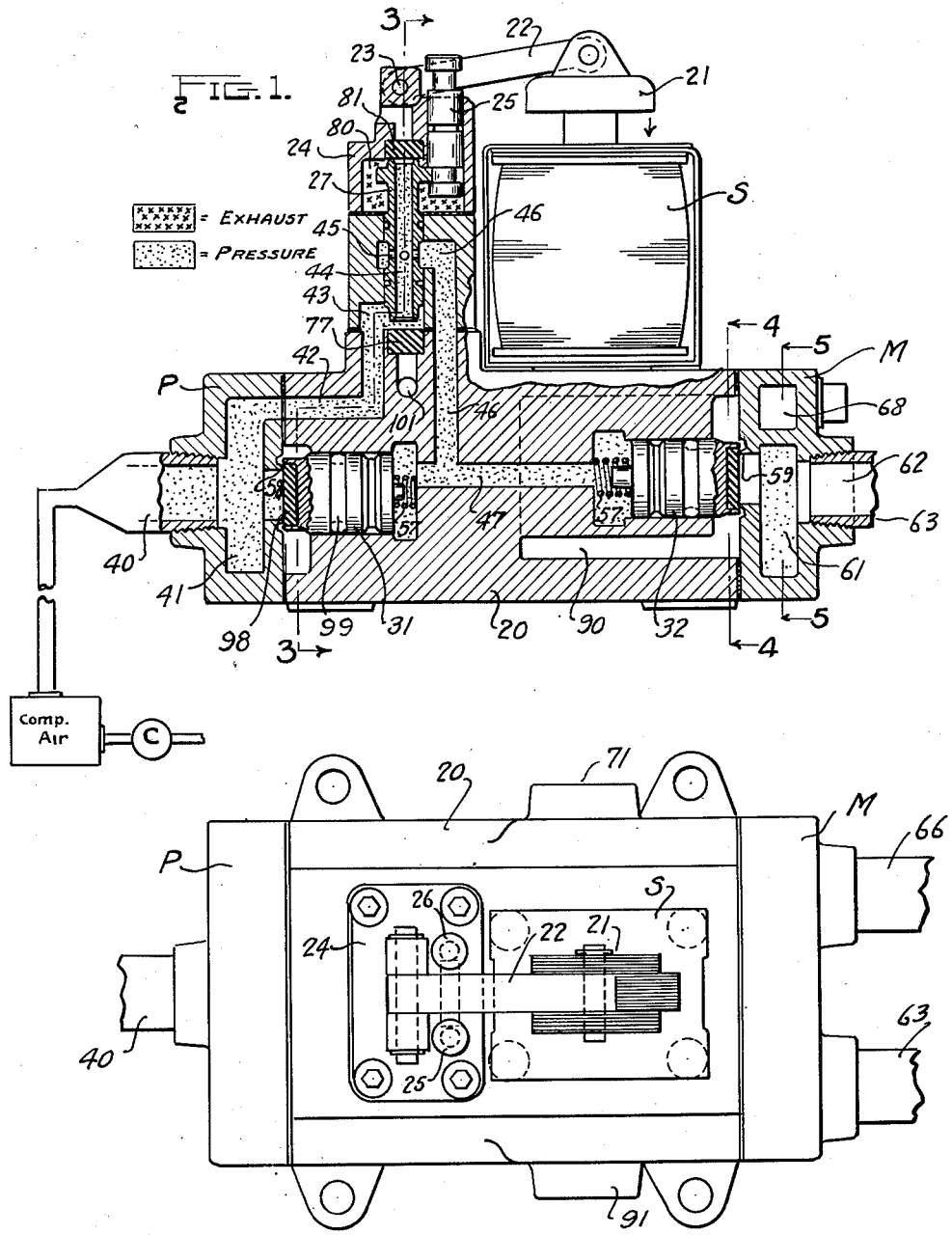

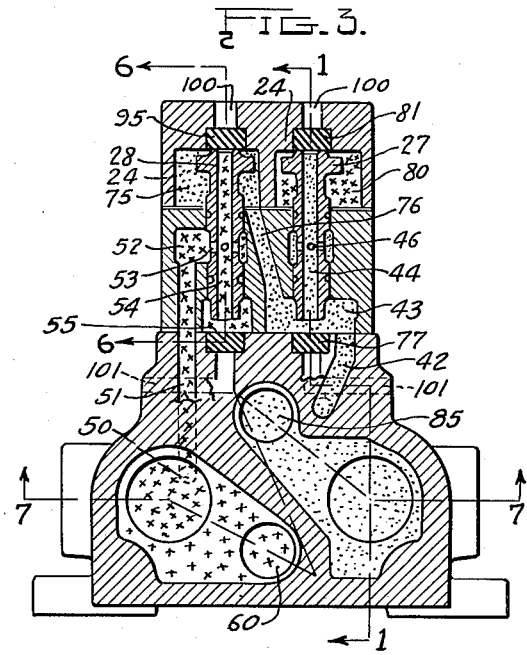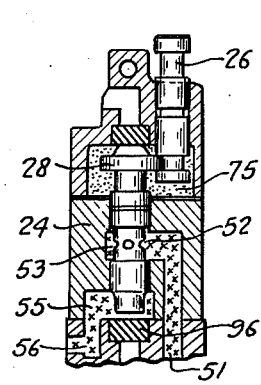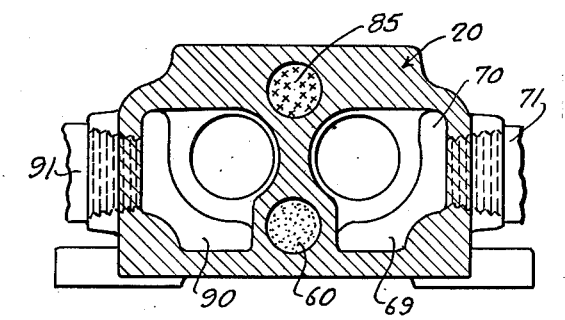

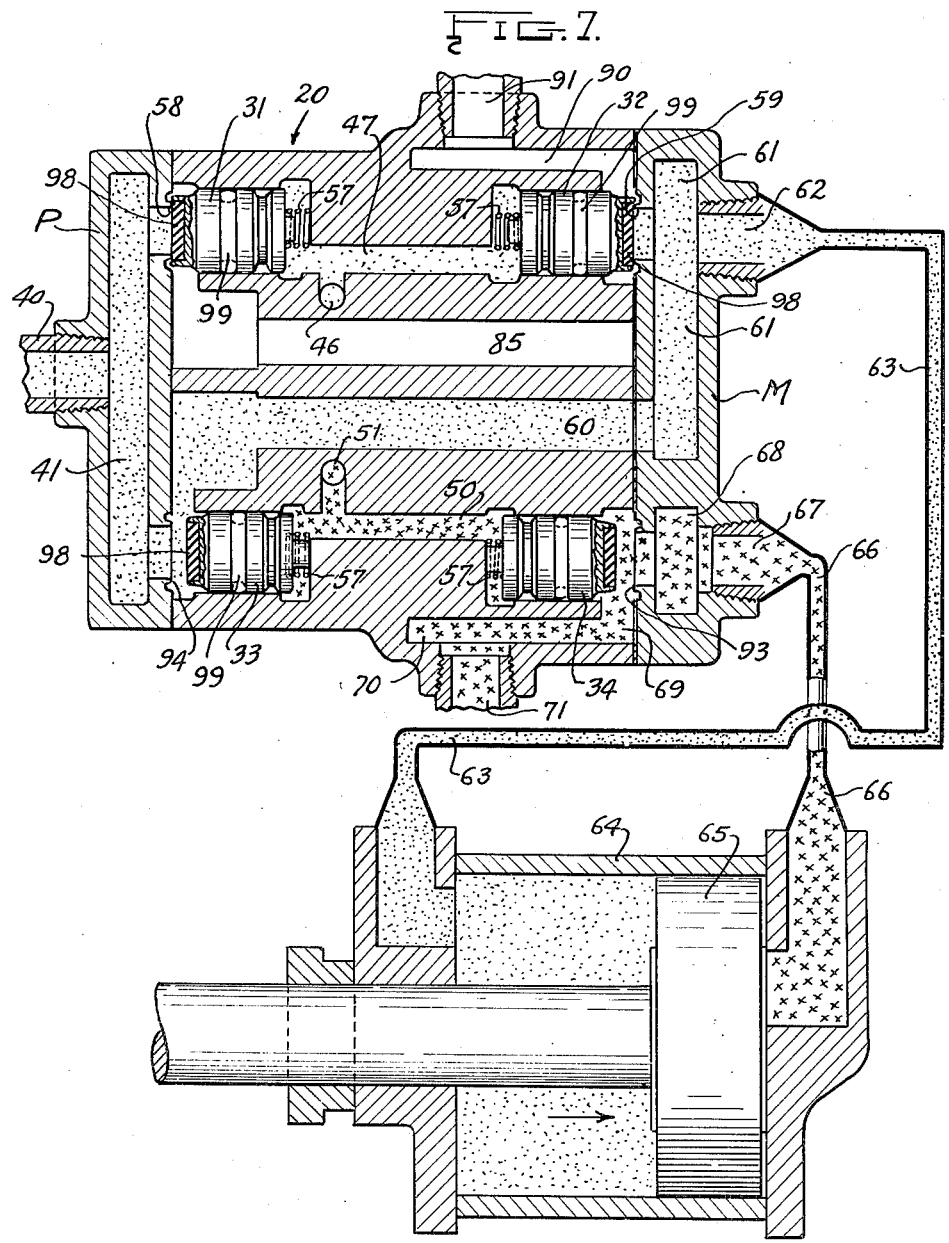

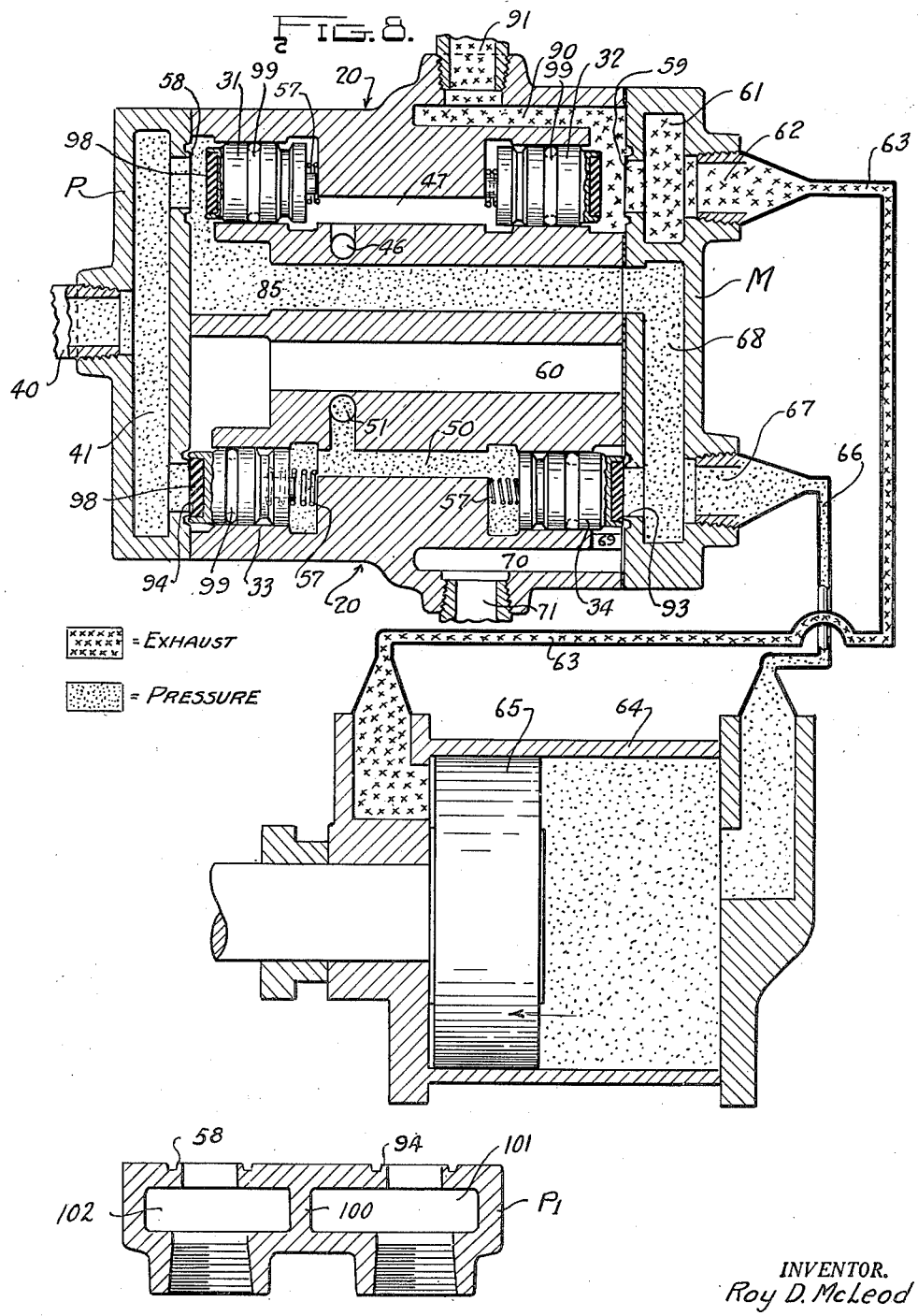

2,583,185

UNITED STATES PATENT OFFICE 2,583,185

RAPID OPERATING POPPET AIR VALVE

Roy D. McLeod, Detroit, Mich., assignor of two-thirds to William Carls, Milford, Mich., and one-third to Sophia Louise Brussel and the Detroit Trust Company, coexecutors of Fred H. Brussel, deceased Application May 22, 1945, Serial No. 595,133

6 Claims. (Cl. 121—46.5)

This invention relates to an air control valve.

In the use of compressed air as a power medium, means must be provided to control the air as it comes from the reservoir or tank and is directed to the air motor. This means must stop the air flow, start the air flow and change its application to one point or another as desired.

An advantage of air power over hydraulic is that it may be used for rapidly repeating movements. The air itself has relatively no inertia and is ideal for high speed repetition of movement. The only limitation in the way of rapid operation is the capacity of the control valves or the power device to move with rapidity since the air itself is always available.

The purpose of this description is the disclosure of an air control valve which surpasses any now available in many ways:

(1) More rapid operation is possible.

(2) Less power is required for operation, i. e., electrical, mechanical or manual valve actuation effort.

(3) Self-sealing valve seats.

(4) Independent poppets for reversal, eliminating connecting push rods and eliminating necessity for extreme accuracy in bore alignment; no stem through valve orifice.

(4a) Entire action functions in any pressure from 0 to full line—All effective area ratios are constant.

(5) Pressure, rather than spring, biased valves.

(6) Double exhaust to cut down exhaust lag.

(7) Straight-through air travel.

(8) Pilot operation with extremely short stroke and low power actuation and holding effort.

(9) Pilot power unchanged for varying capacity valves.

(10) Same valve design may be used for any capacity valves.

Other inherent advantages in the valve design and operation will be pointed out or will be apparent as a detailed description progresses, supplemented by appended claims.

In the drawings:

Fig. 1 is a sectional view showing one-half of the parts of the valve and the pilot control.

Fig. 2 is a plan view of the valve assembly.

Fig. 3 is a sectional view on line 3—3 of Fig. 1 showing the pilot control.

Fig. 4 is a sectional view on line 4—4 of Fig. 1.

Fig. 5 is a sectional view on line 5—5 of Fig. 1.

Fig. 6 is a partial section on line 6—6 of Fig. 3.

Fig. 7 illustrates a diagrammatic hookup with a cross section of the valve on line 7—7 of Fig. 3.

Fig. 8 is a view similar to Fig. 7 with the solenoid energized.

Fig. 9 is a view similar to Fig. 1 with the solenoid energized with a section through the opposite side of the valve.

Fig. 10 is a view parallel to that of Fig. 3 but showing the solenoid energized.

Fig. 11 is a view of a double inlet manifold.

Referring to the drawings, the control valve to be described has a main poppet housing 20 with a pressure manifold P at one end and a motor manifold M at the other end. On the top of housing 20 is mounted a solenoid winding S with a plunger 21 which operates a lever 22 pivoted at 23 on a pilot housing 24. Lever 22 operates two lifters 25 and 26 which project into valve housing 24 to operate respectively spindle valves 27 and 28 which control pilot air from the main source of pressure to shift the control poppets.

If reference is made to Fig. 7 it will be seen that the housing 20 has four poppet valves 31, 32, 33 and 34.

With this brief description of the moving parts as a background, it is thought that the quickest way to obtain an understanding of the valve passages and operation is to follow a description of the operation. To facilitate the understanding pressure and exhaust legends have been added to some of the drawings with pressure passageways being shown by a plurality of small dots and exhaust passages being shown by a plurality of small crosses. Reference should first be had to Fig. 1 in which solenoid S is shown de-energized. Air under pressure is being furnished to manifold P through a pipe 40. If simultaneous reference is made to Fig. 7 is will be seen that pipe 40 leads to an inner passage 41 which exposes poppets 31 and 33 to pressure. Passage 41 leads upward to a passage 42 in housing 20 which in turn feeds pressure to passage 43 in housing 24. Here the pressure is available to the bottom of spindle valve 27 which being up receives the pressure in a central bore 44 and distributes the same through ports 45 to a downward leading passage 46 back into housing 20 and to a cross passage 47 opening at each end to the backs of poppets 31 and 32.

At this same time the backs of poppets 33 and 34 are connected to exhaust by a connecting passage 50 which rises through a passage 51 (Fig. 3) to a port 52 around valve 28 which through ports 53 connects to central bore 54 leading to the bottom chamber 55. This bottom chamber 55 is connected to atmosphere through a passage 56 shown in Figs. 9 and 10. With pressure behind poppets 31 and 32 and aided by the spring 57 behind each of the poppets, these poppets will move outwardly to seat at their respective ports 58 and 59 (Fig. 7). With exhaust in passage 50 between poppets 33 and 34 pressure in passage 41 will push poppet 33 inward and force itself into passage 60 which leads through the valve to a manifold port 61 and thence outwardly to port 62 to a line 63 leading to cylinder 64 within which is a piston 65 urged to the right by pressure. Meanwhile, the air on the right side of piston 65 has passed through a line 66 to a port 67 in manifold M thence to a port 68 and into an exhaust passage 69 after moving the poppet 34 against its spring. Passage 69 leads through a passage 70 to an exhaust or atmospheric outlet 71.

When the solenoid S is energized, plunger 21 will move downwardly shifting lever 22 and shifting the lifters 25 and 26 which are normally held upward by reason of pressure in chamber 75 acting on the bottom of lifter 26 (Fig. 6). This pressure in chamber 75 is always present since it passes from a cross bore 76 leading from chamber 43 always under pressure from the pressure manifold P (Fig. 3). The shifting of lifters 25 and 26 downward will carry valves 27 and 28 downward by reason of the connection between the valve and the lifters shown in Fig. 1. These valves will then be in the position shown in Figs. 9 and 10. Under these circumstances pressure enters pipe 40, passes through 41 and 42 to chamber 43 thence upward through cross passage 76 to chamber 75. Since valve 27 is now seated against a neoprene disc 77, the pressure cannot enter the central bore of the valve as it did when the solenoid was de-energized. Pressure does pass from chamber 75 through the central bore 54 of valve 28 where it passes through ports 53 to chamber 52 and the downward leading passage 51 and the cross passage 50 between poppets 33 and 34. Valve 33 thus has equal pressure on both sides and will shift to a closed position by action of spring 57 backing it up. Passage 47 between poppets 31 and 32 is now connected to exhaust through passage 46, ports 45, central bore 44 of valve 27 which connects with the upper exhaust chamber 80, now open to the central bore 44 by reason of the fact that valve 27 is lowered away from the neoprene disc 81. A cross passage 82 (Fig. 10) leads to exhaust chamber 55 at the bottom of valve 28 and also to the exhaust outlet 56.

If reference is now made to Fig. 8 it will be seen that the operating poppets are in pneumatically opposed pairs in that poppets 33 and 34 are backed by pressure while poppets 31 and 32 are connected by an exhaust passageway 47. Pressure entering 41 now moves poppet 31 away from its seat 58 and allows the air under pressure to pass to passage 85 where it meets a cross passage 68 and lead outward through port 67 to pipe 66 and the right-hand end of cylinder 64 shifting piston 65 to the left. Piston 65 forces exhaust air through conduit 63 to port 62 and passage 61 thence moves poppet 32 off from its seat to exhaust through port 90 and exhaust opening 91. Poppet 34 is meanwhile held on its seat 93 by reason of the pressure in the passage 50. Poppet 33 is held on its seat 94 for the same reason. During this action the bore 54 of valve 28 is opened to pressure chamber 75 since the valve is shifted downwardly from the neoprene disc 95, valve 28 being seated against neoprene disc 96 thus closing central bore 54 from exhaust chamber 55.

The cycle may then be reversed as often as desired by directing electrical impulses to the solenoid S by reason of the balanced construction, the valves may be operated by a very small current. It has been found that for an installation using a three-quarter inch pipe, a three-eighths inch stroke for the solenoid has been the maximum power needed is only 3.6 amperes for movement and .8 ampere for holding on a 110 volt, 60 cycle circuit. This stroke and amperage requirement will hold for valves of any capacity. It will be noted further that the manifolds P and M are so located that the valve housing 20 may be removed without disturbing the piping connections thereto. If by change a valve poppet becomes faulty the entire housing may be removed without disturbing the connections and a new housing inserted. All the air seal packing is in the poppets themselves including an end seat disc 98 and a sliding seal 99 (Fig. 1). Another advantage is that a double manifold $P_1$ may be used as shown in Fig. 11 in place of manifold P so that high pressure could be inserted for one motion of the piston 65 and low pressure for another as, for example, in use with vertical loads. The double manifold $P_1$ is identical with the manifold P as shown in vertical section Fig. 1 and in elongated horizontal section in Fig. 7, except for a septum 100 which separates low and high pressure chambers 100 and 101 respectively.

Another novel construction feature lies in the use of the sealing discs 77, 81 and 95 and 96. These discs are each backed by an exhaust opening of larger diameter than the central bore of valve 27 and 28. Consequently, whenever these discs are not serving as a sealing surface, pressure tends to force them into their seat against the atmosphere in openings 100 or 101. No other holding means is required for these discs. The valves 27 and 28 while they have a slide action, have the advantage of a positive poppet-type seal against these discs. These valves 27 and 28 also function entirely without springs inasmuch as pressure constant in chamber 75 against lifter 26 is transmitted through the lever 22 to lifter 25. The springs 57 backing up each of the poppets 31, 32, 33 and 34 are so arranged that when the poppets are closed the springs are at rest. Thus the valve poppets are not dependent at all upon spring holding or sealing. The only function of the spring 57 is to start the valves in motion to their seat after pressure is taken away from their sealing surface.

The preferred embodiment of the invention is described as an air valve, but it will be understood that other fluids could be controlled by the valve and it is intended that the claims shall be so interpreted.

What I claim is:

1. An air pressure control valve comprising a housing, having a pressure inlet port, two motor ports and two exhaust ports, a pressure passage from said inlet port to each of said motor ports, an exhaust passage connecting each exhaust port with a pressure passage, substantially cylindrical poppets slidable in said passages with a first pair of poppets arranged in said housing with an end surface of each connected together, a second pair of poppets arranged in said housing with an end surface of each connected together, one of each of said pairs being shiftable to block a pressure passage and one of each of said pairs being shiftable to block an exhaust passage, spring means to exert a closing bias on said poppets when in open position, and pilot means arranged to direct pressure selectively and alternately to connected end surfaces of one pair of poppets while opening the other connected surface of the other poppets to atmosphere to cause seating of one of said pairs while pressure air and exhaust air open the respective poppets of the other pair to connect one motor port to the inlet port and the other motor port to an exhaust port, each of the said one pair of poppets being exposed at one end to pilot pressure and at the other end centrally and partially to motor port pressure when seated, the effective exposed area of each said partially exposed ends and of the seats being less than that of the ends of each poppet exposed to pilot pressure.

2. A fully pneumatic air pressure control valve comprising a housing assembly having a pressure inlet port, two motor ports and exhaust outlets, pressure paths through said assembly from the inlet port to each motor port, exhaust paths through said assembly from each outlet motor port to an exhaust outlet, each pressure path leading to a motor port being coincident with the exhaust path leading from said port at a portion of the respective paths, slidable poppets in each of said paths cooperating with seats in said assembly to block said paths when seated, each of said poppets having an operating end to overlie and cooperate with said seats and a pilot end surface, the operating end of the poppets in each exhaust path being exposed centrally and partially in the portion overlying the seat to a pressure path coincident with the particular exhaust path, pilot pressure-exhaust passages in said housing assembly to said pilot end surfaces, spring means to exert a closing bias on said poppets when in open position, and means to direct pilot pressure from said air supply to the pilot end of a pair of poppets in a pressure path and exhaust path, respectively, while connecting the pilot end surface of another pair of poppets to exhaust, said means being shiftable to reverse the effect of said pilot pressure on said poppets, whereby one of said outlets is connected to said pressure supply while the other is connected to exhaust.

3. A fully pneumatic air pressure control valve comprising a housing assembly having a pressure inlet port, two motor ports and exhaust outlets, pressure paths through said assembly from the inlet port to each motor port, exhaust paths through said assembly from each outlet motor port to an exhaust outlet, each pressure path leading to a motor port being coincident with the exhaust path leading from said port at a portion of the respective paths, means forming annular seats in each of said paths, slidable poppets in each of said paths cooperating with said seats selectively to block said paths, each of said poppets having an operating end to overlie and cooperate with said seats and a pilot end surface, the effective area of said seats being less than the effective area of said poppets at the pilot end, the operating end of the poppets in each exhaust path being exposed centrally and partially in the portion overlying the seat to a pressure path coincident with such exhaust path, spring means to exert a closing bias on said poppets when in open position, and means to direct pilot pressure from said air supply to the pilot ends on said poppets to shift to a seated position selectively a pair of poppets in a pressure path and an exhaust path respectively, said means connecting the pilot ends of another pair of poppets in other pressure and exhaust paths to atmosphere, whereby pressure from said supply opens one poppet and passes to one of said motor ports and exhaust air from another motor port opens the other poppet and passes to an exhaust outlet.

4. A fully pneumatic air pressure control valve comprising a housing assembly, means to supply air under pressure thereto, pressure paths through said assembly to outlets therein, exhaust paths through said housing from each outlet, means forming annular seats in each of said paths, slidable poppets in each of said paths cooperating to overlie, in a central portion of one end, said seats selectively to block said paths, the effective area of said seats and the overlying portions of the poppets being less than the area of said poppets in cross-section, springs to exert a closing bias on said poppets when in open position, and means to control pressure on a working area of said poppets alternatively and selectively to expose a pair of poppets in a pressure path and an exhaust path respectively to pressure at both ends whereby such poppets assume a closed position, and to expose another pair of poppets in a pressure path and an exhaust path respectively to atmosphere at the working area ends, and, respectively, to working pressure and exhaust pressure at the seat ends whereby such poppets assume an open position.

5. A fully pneumatic air pressure control valve comprising a housing assembly, means to supply air under pressure thereto, pressure paths through said assembly to outlets therein, exhaust paths through said housing from each outlet, slidable poppets in each of said paths cooperating with seats in said housing selectively to block said paths, the exposed working area of the seat end of said poppets being less than the effective area of the opposite pilot end when said poppets are in seated position, pilot passages leading from said air supply and from exhaust openings to said pilot ends of said poppets, and means selectively to direct air under pressure to the pilot end of a pair of poppets in a pressure path and exhaust path, respectively, said means connecting the pilot ends of another pair of poppets to exhaust, said pressure and exhaust paths being positioned with respect to said poppets such that when each poppet of one pair is subjected to pressure at both ends, the seat ends of said other pair are exposed respectively to working pressure and exhaust pressure, and springs acting in cooperation with each of said poppets arranged to exert closing bias on said poppets except when in closed position.

6. An air pressure control valve comprising a housing assembly including a body provided with four relatively parallel air passages from end to end, cylindrical valve pockets at the outer ends of a first pair of said passages, ports formed in said body connecting two of said pockets respectively to the second pair of parallel air passages, means connecting said two pockets to a pressure inlet port, ports in said body connecting said other two pockets to exhaust outlets, means connecting said other two pockets to motor operating openings and to said second pair of air passages, each of said means having seat formations opposite the valve pockets, poppets in each of said pockets to co-operate with said seat formations selectively to close said ports when said poppets engage said seats, and pilot openings in said body to connect the said first pair of air passages selectively to pilot pressure and exhaust to cause actuation of said poppets in pairs, spring means to bias said poppets to a seated position when open, only a portion of said poppets overlying said seats whereby pressure at said seats acts on less effective area of said poppets than is exposed to the first pair of air passages.

ROY D. McLEOD.

(References on following page)

REFERENCES CITED

The following references are of record in the file of this patent:

UNITED STATES PATENTS

| Number | Name | Date |
|---|---|---|
| 354,020 | Morey | Dec. 7, 1886 |
| 410,183 | Ongley | Sept. 3, 1889 |
| 412,327 | Gibson | Oct. 8, 1889 |
| 425,202 | Blanchard | Apr. 8, 1890 |
| 537,103 | Berry | Apr. 9, 1895 |
| 639,673 | Dyblie | Dec. 19, 1899 |
| 1,105,947 | Woods | Aug. 4, 1914 |
| 1,777,128 | Powell | Sept. 30, 1930 |
| 1,835,734 | Wanzenberg | Dec. 8, 1931 |
| 1,930,557 | Hughes | Oct. 17, 1933 |
| 2,243,937 | Almond | June 3, 1941 |
| 2,376,918 | Hughes | May 29, 1945 |

FOREIGN PATENTS

| Number | Country | Date |
|---|---|---|
| 23,822 | Great Britain | of 1898 |
| 40,250 | Austria | Dec. 27, 1909 |
| 356,133 | Great Britain | Pub. Oct. 1, 1931 |